US012345233B2

(12) United States Patent
Lund et al.

(10) Patent No.: US 12,345,233 B2
(45) Date of Patent: Jul. 1, 2025

(54) PITCH CONTROL OF WIND TURBINE BLADES IN A STANDBY MODE

(71) Applicant: Vestas Offshore Wind A/S, Aarhus N (DK)

(72) Inventors: Kasper Bitsch Lund, Århus C (DK); Fabio Caponetti, Åbyhøj (DK); Andre Brandao Martins, Lisbon (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 695 days.

(21) Appl. No.: 17/292,398

(22) PCT Filed: Nov. 7, 2019

(86) PCT No.: PCT/EP2019/080459
§ 371 (c)(1),
(2) Date: May 7, 2021

(87) PCT Pub. No.: WO2020/094752
PCT Pub. Date: May 14, 2020

(65) Prior Publication Data
US 2022/0010770 A1    Jan. 13, 2022

(30) Foreign Application Priority Data
Nov. 7, 2018   (EP) .................................... 18204859

(51) Int. Cl.
*F03D 7/02*   (2006.01)
*F03D 7/04*   (2006.01)
(Continued)

(52) U.S. Cl.
CPC ......... *F03D 7/0224* (2013.01); *F03D 7/0284* (2013.01); *F03D 7/043* (2013.01);
(Continued)

(58) Field of Classification Search
CPC ...... F03D 7/0224; F03D 7/0284; F03D 7/043; H02J 3/381; H02J 7/34; H02J 2300/28;
(Continued)

(56) References Cited

U.S. PATENT DOCUMENTS

2008/0054641 A1    3/2008   Voss
2008/0069692 A1*   3/2008   Oohara ................... F03D 7/043
                                                               416/31

(Continued)

FOREIGN PATENT DOCUMENTS

CN        101228351 A    7/2008
CN        102317622 A    1/2012
(Continued)

OTHER PUBLICATIONS

European Search Report for Application EP 18 20 4859 dated Apr. 16, 2019.
(Continued)

*Primary Examiner* — Charles R Kasenge
(74) *Attorney, Agent, or Firm* — Patterson + Sheridan, LLP

(57) ABSTRACT

Operating a wind turbine generator (WTG) comprising a pitch control system, the operation comprising: a) operating the WTG in a normal mode while the WTG is connected to an external grid; b) controlling the pitch angle of the blades using a normal pitch control mode while the WTG is operating in the normal mode; c) detecting a grid loss; d) operating the WTG in a standby mode during the grid loss; and e) controlling the pitch angle of the blades in dependence on a monitored speed parameter of the WTG using a standby pitch control mode different to the normal pitch control mode while the WTG is operating in the standby mode, wherein the standby pitch control mode is less responsive than the normal pitch control mode such that the (Continued)

power consumption of the pitch control system is reduced when the WTG is operating in the standby mode.

20 Claims, 4 Drawing Sheets

(51) Int. Cl.
*H02J 3/38* (2006.01)
*H02J 7/34* (2006.01)

(52) U.S. Cl.
CPC ........... *H02J 3/381* (2013.01); *F05B 2260/76* (2013.01); *F05B 2270/327* (2013.01); *F05B 2270/337* (2013.01); *H02J 7/34* (2013.01); *H02J 2300/28* (2020.01)

(58) Field of Classification Search
CPC ............ F05B 2260/76; F05B 2270/327; F05B 2270/337; F05B 2270/101; F05B 2270/1071; F05B 2270/602; Y02E 10/72; Y02E 10/76
See application file for complete search history.

(56) References Cited

U.S. PATENT DOCUMENTS

| | | |
|---|---|---|
| 2011/0305568 A1 | 12/2011 | Brath et al. |
| 2016/0305402 A1 | 10/2016 | Caponetti et al. |
| 2018/0266391 A1 | 9/2018 | Danielsen |

FOREIGN PATENT DOCUMENTS

| | | | |
|---|---|---|---|
| CN | 102374120 A | 3/2012 | |
| CN | 102454548 A | 5/2012 | |
| CN | 102792581 A | 11/2012 | |
| CN | 104662289 A | 5/2015 | |
| CN | 106121914 A | 11/2016 | |
| EP | 1961957 A2 | 8/2008 | |
| EP | 2146095 A2 | 1/2010 | |
| EP | 3076011 A1 | 10/2016 | |
| WO | 2013034610 A2 | 3/2013 | |
| WO | WO-2016120467 A1 * | 8/2016 | ............ F03D 13/30 |
| WO | 2020094752 A1 | 5/2020 | |

OTHER PUBLICATIONS

PCT International Search Report for Application No. PCT/EP2019/080459 dated Jan. 27, 2020.
PCT Written Opinion of the International Searching Authority for Application No. PCT/EP2019/080459 dated Jan. 27, 2020.
Chinese Patent Office, Office Action for Chinese Patent Application No. 2019800880591, dated Jan. 11, 2024.
European Patent Office, Communication of a Notice of Opposition for European Patent Application No. 19801522.4, dated Apr. 25, 2024.
Chinese National Intellectual Property Administration, Third Office Action for Chinese Patent Application No. 2019800880591, dated Oct. 1, 2024.
Chinese Patent Office, Second Office Action for Chinese Patent Application No. 2019800880591, dated Jul. 31, 2024.
Decision of Rejection received for Chinese Patent Application No. 201980088059.1, mailed on Jan. 1, 2025, 22 pages (7 pages of English Translation and 15 pages of Original Document).
Ying, C. et al., "Wind Power Generation Technology and Application", Railway Publishing House, Dec. 2013, pp. 185-186.

* cited by examiner

PITCH CONTROL OF WIND TURBINE BLADES IN A STANDBY MODE

TECHNICAL FIELD

The present disclosure relates to a method of operating a wind turbine generator (WTG), and in particular to a method of controlling the pitch angle of the blades of a WTG while the WTG is operating in a standby mode during a grid loss.

BACKGROUND

Wind power plants (WPPs), also referred to as wind farms or wind parks, typically Include a number of wind turbines or wind turbine generators (WTGs) that are configured to generate power to be supplied to an external grid. During normal operating conditions the WTGs of a WPP continuously generate power to be supplied to the external grid. However, under certain operating conditions the WPP may experience a "grid loss" in which the WTGs are prevented from supplying power to the external grid, for example because the external grid is unavailable or is determined to have become unstable. In this case the WTGs may be switched into a standby mode in which the WTGs continue to run (i.e. the rotors continue to rotate) but are not operated to generate power to be supplied to the external grid.

During the grid loss, the WTGs may be disconnected from their usual power supply. In this case critical sub-systems of the WTGs including, for example, the WTGs' pitch control systems, may continue to be powered by backup power systems including a battery storage system and/or a diesel generator. However, over time these backup power systems may become depleted, in which case it may be necessary for the WTGs to be completely stopped.

In some cases the WTGs may be operated to generate backup power while operating in the standby mode, which may be used to recharge the backup power systems. However, it is still possible for the backup power systems to become depleted, for example if the power usage of critical sub-systems exceeds backup power generation over a prolonged time period.

It is an object of the present invention to address the disadvantages of known WPPs of the type described above.

SUMMARY OF THE INVENTION

According to an aspect of the present invention there is provided a method of operating a wind turbine generator (WTG) comprising a pitch control system, the method comprising: a) operating the WTG in a normal mode while the WTG is connected to an external grid; b) controlling the pitch angle of the blades using a normal pitch control mode while the WTG is operating in the normal mode; c) detecting a grid loss; d) operating the WTG in a standby mode during the grid loss; and a) controlling the pitch angle of the blades in dependence on a monitored speed parameter of the WTG using a standby pitch control mode different to the normal pitch control mode while the WTG is operating in the standby mode, wherein the standby pitch control mode is less responsive than the normal pitch control mode such that the power consumption of the pitch control system is reduced when the WTG is operating in the standby mode.

For example, when the normal pitch control mode is active, the pitch angle of the blades may be adjusted substantially continuously, for example in response to small and/or transient changes in operating parameters such as generator speed and/or rotor speed, in order to provide accurate control of the speed of the WTG and to optimise and/or maximise the power output of the WTG. However, while the WTG is operating in the standby mode, higher activation thresholds may be applied such that the pitch angle of the blades is only adjusted if the monitored speed parameter deviates from a target speed consistently over a sustained period of time (for example a period of at least 30 seconds) and/or by a large or significant extent (for example by at least +50%/−30%).

By controlling the pitch angle of the blades using a separate standby pitch control mode while the WTG is operating in the standby mode, the present invention enables the WTG to continue to control the pitch angle of the blades in order to control the rotor speed (as well as the generator speed in cases where the generator remains connected while the WTG is operating in the standby mode). However, since the standby pitch control mode is less responsive than the normal pitch control mode, the WTG will perform fewer pitch angle adjustment operations and therefore use less energy while operating in the standby mode compared to an alternative situation in which the normal pitch control mode continues to be applied continuously while the WTG is operating in the standby mode. In this way it is possible to prevent unnecessarily regular pitch angle adjustments from being performed while the WTG is operating in the standby mode, and to extend the time for which the WTG may be operated in the standby mode before the power source used to power critical sub-systems of the WTG becomes depleted. The reduction in standby power usage may also enable a reduction in the required capacity of the WTG's backup power system.

The WTG may optionally be operated to generate backup power while operating in the standby mode in order to further extend the time for which the WTG may be operated in the standby mode. The backup power generated by the WTG may, for example, be used to charge an energy storage system associated with the WTG and/or to power one or more sub-systems of the WTG. The backup power generated by the WTG in the standby mode is generally of lower quality than the power generated during normal operation due to the lower responsiveness of the standby pitch control mode. However, the reduction in quality is offset by the reduction in standby power usage due to the lower number of pitch angle adjustment operations.

The WTG is preferably operated at a reduced speed when in the standby mode compared to when the WTG is operating in the normal mode. For example, the WTG may be operated with a target generator speed in the range 40-100 rpm. A generator speed in the range 40-100 rpm has been determined to be particularly well suited to generating backup power in the standby mode.

It will be appreciated that different manufacturers may use different terms to refer to different modes of operation. However, the term "standby mode" as used in this specification refers to a mode for use during a grid loss in which the WTG continues to run (i.e. the rotor continues to rotate) but the WTG is not operated to supply power to the external grid.

While the WTG is operating in the standby mode, the pitch angle of the blades may be adjusted if a first activation condition is met, but maintained without adjustment if the first activation condition is not met; the first activation condition comprising the monitored speed parameter falling outside a first threshold over a specified time period. In this way it may be ensured that the pitch angle of the blades is adjusted in response to sustained changes in operating conditions without also being adjusted in response to brief or transient changes. For the avoidance of doubt, the speed parameter may be generator speed or rotor speed. For embodiments in which the generator is supplying backup power to the WTG, for example to store an energy storage system or to power one or more sub-systems of the WTG directly, it may be preferred that the generator speed is monitored directly.

The first threshold may have an upper limit of at least +20% and/or a lower limit of at least −20% of a target speed. Defined another way, the first threshold may have an upper limit of at least +10 rpm and/or a lower limit of at least −10 rpm of a target generator speed. The target speed may be an explicitly defined target speed, or alternatively may be a mid-point between the upper and lower limits of the first threshold. It will be appreciated that the lower limit is not essential, and that in some cases the first threshold may only include an upper limit.

The first threshold may span a range of generator speeds of at least 20 rpm.

The first threshold may have an upper limit corresponding to a generator speed in the range 70-120 rpm and/or a lower limit corresponding to a generator speed in the range 30-50 rpm.

The specified time period may be at least 30 seconds, and preferably at least 100 seconds.

Alternatively, or in addition, while the WTG is operating in the standby mode, the pitch angle of the blades may be adjusted if a second activation condition is met, but maintained without adjustment if the second activation condition is not met; the second activation condition comprising the monitored speed parameter falling outside a second threshold. The second threshold is preferably greater (for example wider) than the first threshold. The second activation condition may not be time-dependent. In other words the monitored speed parameter may not be required to fall outside the second threshold for a significant period of time in order for the second activation condition to be met.

Instead the pitch angle of the blades may be adjusted substantially immediately after the monitored speed parameter has fallen outside the second threshold (irrespective of how long the monitored speed parameter has departed from the second threshold). In this way it may be ensured that the pitch angle of the blades is adjusted quickly in response to large or significant changes in operating conditions without also being adjusted in response to small changes.

The second threshold may have an upper limit of at least +50% and/or a lower limit of at least −30% of a target speed. Defined another way, the second threshold may have an upper limit of at least +30 rpm and/or a lower limit of at least −20 rpm of a target generator speed. The target speed may be an explicitly defined target speed, or alternatively may be a mid-point between the upper and lower limits of the second threshold. It will be appreciated that the lower limit is not essential, and that in some cases the second threshold may only include an upper limit.

The second threshold may span a range of generator speeds of at least 50 rpm.

The second threshold may have an upper limit corresponding to a generator speed in the range 90-200 rpm and/or a lower limit corresponding to a generator speed in the range 10-40 rpm.

In a preferred embodiment both the first (time-dependent) activation condition and the second (non-time-dependent) activation condition are used in combination such that the pitch angle of the blades is adjusted if either one (or both) of the first and second activation conditions is met, but maintained without adjustment if neither of the first and second activation conditions is met. However, in other embodiments it may be preferred to only apply one of the first and second activation conditions.

The method may comprise increasing a gain factor used for controlling the pitch angle of the blades if it is determined that the pitch angle of the blades is to be adjusted while the WTG is operating in the standby mode, for example if the first and/or second activation conditions have been met. Otherwise the gain factor may be maintained at its current value without adjustment, for example at a value of 0, such that no pitch angle adjustment operation is performed.

The gain factor may be increased to a first predetermined value if the first activation condition has been met. The first predetermined value may be a value of 1. The gain factor may be increased over a time period at a first gain rate in order to avoid a step change in the gain factor. The gain factor may subsequently be reduced, for example back to a value of 0, after the pitch angle of the blades has been adjusted.

The gain factor may be increased above a value of 1 if the second activation condition has been met. In this way the responsiveness of pitch angle control may be artificially increased if the second activation condition has been met. The gain factor may be increased at a second gain rate, which may be different to the first gain rate. The gain factor may subsequently be reduced, for example back to a value of 0, after the pitch angle of the blades has been adjusted.

The method may comprise, while the WTG is operating in the standby mode, de-activating a pitch angle control module that is normally used for setting the pitch angle of the blades. The pitch angle control module may be de-activated automatically upon the WTG entering the standby mode. In some cases de-activating the pitch angle control module may comprise completely de-powering the pitch angle control module. However, in other cases the pitch angle control module may simply be prevented from adjusting the pitch angle of the blades in accordance with the normal pitch control mode while the WTG is operating in the standby mode. (It will be appreciated that the pitch angle control module may not be a stand-alone unit, but may instead be a portion of a wider control system, for example a WTG controller.)

The WTG may also be configured to de-activate one or more other non-critical sub-systems including, for example, a lift system, a lighting system, a heating system, a cooling system, a ventilation system, a hydraulic pump system and/or non-critical sensor systems while the WTG is operating in the standby mode.

The method may further comprise re-activating the pitch angle control module and using the pitch angle control module to set the pitch angle of the blades if it is determined that the pitch angle of the blades is to be adjusted while the WTG is operating in the standby mode, for example if the first and/or second activation conditions have been met. The pitch angle control module may subsequently be de-activated after having been used to re-set the pitch angle of the blades. The pitch angle of the blades may be adjusted in accordance with the normal pitch control mode if it is determined that the pitch angle of the blades is to be adjusted while the WTG is operating in the standby mode.

Alternatively, the pitch angle of the blades may be set by a separate control module while the WTG is operating in the standby mode. The separate control module may be a relatively simple controller that has lower power consumption than the pitch angle control module.

A lower pitch rate may be applied when adjusting the pitch angle of the blades when the WTG is operating in the standby mode compared to when the WTG is operating in the normal mode. For example, the pitch rate may be reduced by at least 30% when the WTG is operating in the standby mode.

The monitored speed parameter may be monitored (for example by being compared to a target speed and/or one or more activation thresholds) at a lower frequency when the WTG is operating in the standby mode compared to when the WTG is operating in the normal mode. For example, a monitoring period of at least 5 seconds may be applied when the WTG is operating in the standby mode.

According to a further aspect of the present invention there is provided a controller configured to control operation of a WTG in accordance with the method described above. The controller may include one or more memory modules for storing instructions and one or more processing modules for executing stored instructions. The controller may form part of a WTG controller associated with the WTG and/or a power plant controller associated with a power plant within which the WTG is located. It will be appreciated that the memory modules and processing modules need not be provided together at a single location, and may, in some cases, be split between the WTG controller and the power plant controller.

According to a further aspect of the present invention there is provided a computer program downloadable from a communications network and/or stored on a machine readable storage medium comprising program code instructions for implementing a method in accordance with the method described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
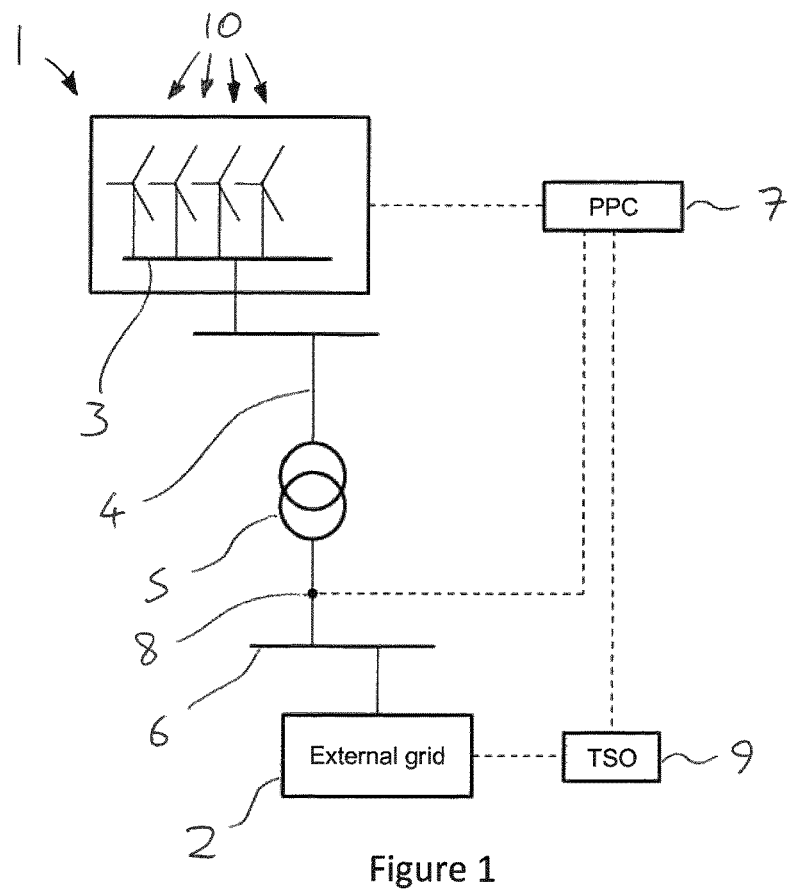
FIG. 1 schematically illustrates a wind power plant, its connection to an external grid, and its control system.

FIG. 1 schematically illustrates a portion of a transmission network including a wind power plant (WPP) 1 in accordance with one possible non-limiting embodiment of the present invention. The wind power plant may also be referred to as a wind farm or wind park. The WPP 1 comprises a plurality of wind turbines or wind turbine generators (WTGs) 10 that are configured to generate power to be supplied to an external grid 2 during normal operation of the WPP 1. As illustrated in FIG. 1, the WTGs 10 are each connected to a local grid 3 of the WPP 1. The local grid 3 is in turn connected to a point of interconnection (POI) bus 6 via which power is fed into the external grid 2 by a transmission line 4 including a main step up transformer 5. The external grid 2 may be a regional, national or international power transmission network, for example the National Grid of Great Britain.

The WPP 1 is provided with a power plant controller (PPC) 7. The PPC 7 is connected to the transmission network at a point of measurement (POM) 8 from which the PPC 7 is able to monitor the state of the transmission network, and to a grid operator or transmission system operator (TSO) 9 from which the PPC 7 is able to receive instructions concerning operation of the WPP 1. The PPC 7 is further connected to the WPP 1, and is configured to control operation of the WPP 1 in accordance with a stored set of operating instructions and instructions received from the TSO 9. In particular, the PPC 7 is configured to communicate information and instructions to controllers 20 of the respective WTGs 10, which in turn control operation of the WTGs and their various sub-systems.

It will be appreciated that the transmission network illustrated in FIG. 1 is shown schematically and in a highly simplified form for illustrative purposes only, and that the WPP 1 may include any desired number WTGs 10, which may be connected to each other and to the external grid 2 in any suitable manner.

Figure 2:
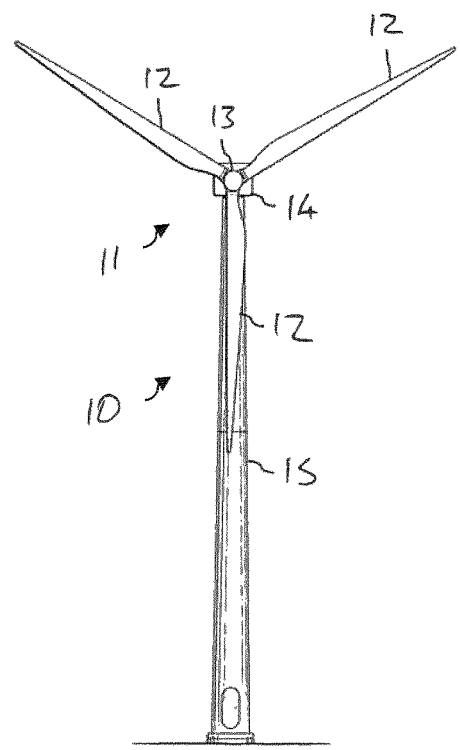
FIG. 2 schematically illustrates a front view of a wind turbine generator of the wind power plant illustrated in FIG. 1.

FIG. 2 schematically illustrates a front view of a typical one of the WTGs 10 of the WPP 1. As shown in FIG. 2, the WTG 10 comprises a rotor 11 including a plurality of blades 12 extending outwardly from a hub 13. The rotor 11 is connected to a nacelle 14 which is in turn connected to a tower 15. The nacelle 14 houses a generator that is configured to be driven by the rotor 11. The WTG 10 is an on-shore horizontal axis wind turbine (HAWT) having three blades. However, it will be appreciated that the present invention may equally be applied to other types of WTG, including off-shore WTGs.

Figure 3:
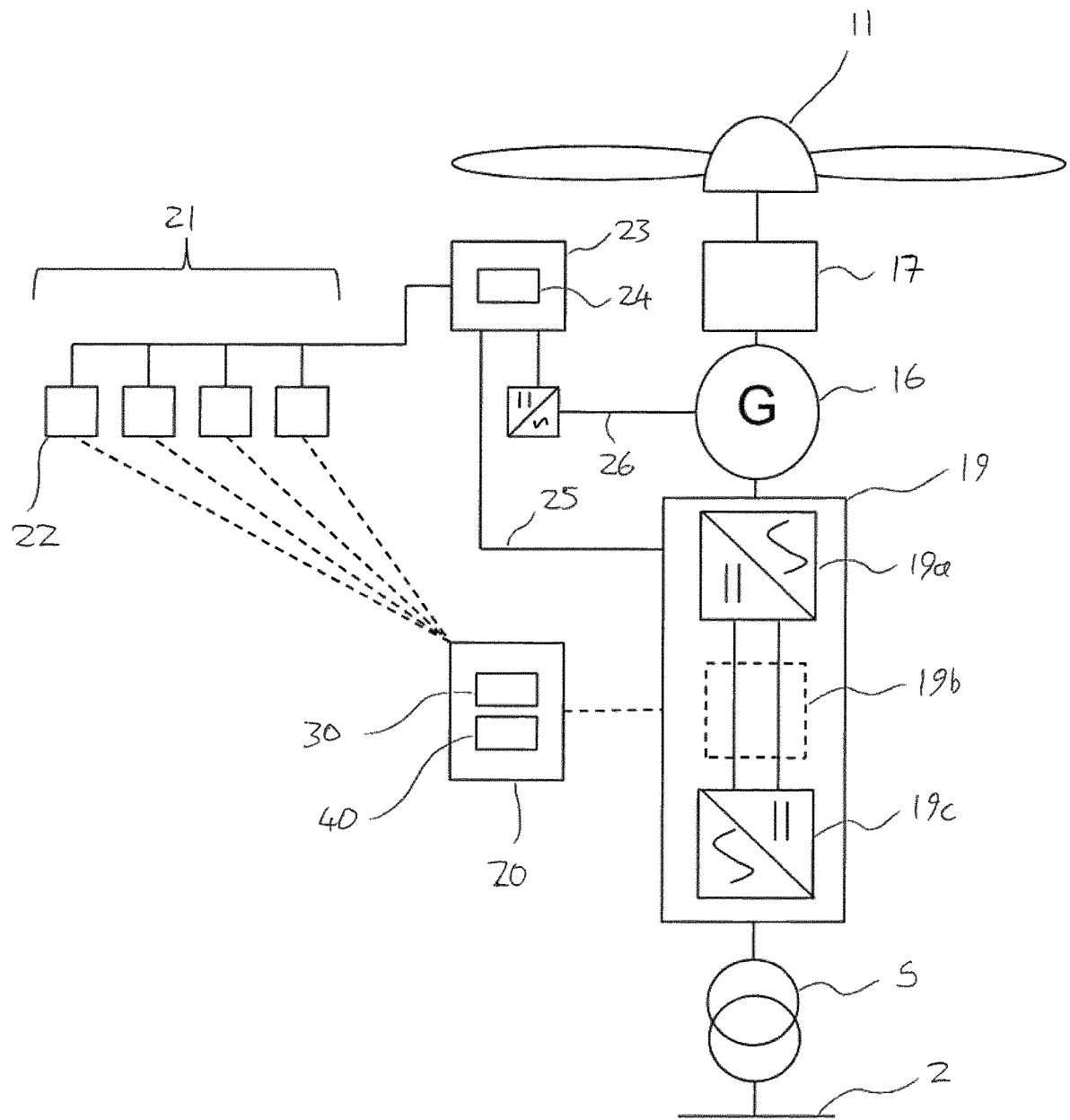
FIG. 3 schematically illustrates the power generation and conversion equipment and various sub-systems of the wind turbine generator illustrated in FIG. 2.

FIG. 3 schematically illustrates the power generation and conversion equipment and various sub-systems of the WTG 10 illustrated in FIG. 2. As shown in FIG. 3, the power generation and conversion equipment comprises a generator 16 which is driven by the rotor 11 via a transmission 17. The transmission 17 may optionally include a gearbox, or may alternatively be a direct drive transmission. The generator 16 is configured to generate power to be supplied to the external grid 2 in the usual manner. The power generation and conversion equipment also comprises a power converter 19 that is configured to convert the output of the generator 16 to a frequency that is compatible with the external grid 2. The power converter 19 may optionally be a full scale converter comprising a machine-side AC-DC converter 19*a*, a DC link 19*b*, and a grid side DC-AC converter 19*c* as illustrated in FIG. 3, although converters of other types may also be used in other embodiments. The power generation and conversion equipment of the WTG 10 is generally controlled by the WTG controller 20.

As also shown in FIG. 3, the WTG 10 further comprises a power system 23 including a battery storage system (BSS) 24 which is configured to be charged by the generator 16 in any suitable manner according to the design of the WTG 10. In some cases the power system 23 may be connected to and configured to be charged by the power converter 19 (as illustrated by connection 25). In this case the power system may optionally be connected to the DC link 19b of the power converter 19, or alternatively to any other suitable portion of the power converter 19. However, in other cases the power system 23 may be configured to be charged by the generator 16 via a separate connection including a further AC-DC converter (see connection 26). The power system 23 is also connected to and configured to supply DC current to various power consuming sub-systems of the WTG at least during grid loss situations, as described in more detail below.

The WTG 10 further comprises various power consuming sub-systems 21, including, for example, a pitch control actuation system 22 including one or more actuators for controlling the pitch angle of the blades 12, a yaw control actuation system comprising one or more actuators for controlling the yaw angle of the nacelle 14, a lubrication system, a lift system, a lighting system, a heating system, a cooling system, a ventilation system, a hydraulic pump system, and various sensor systems, which are also generally controlled by the WTG controller 20.

The power consuming sub-systems 21 may be powered in any suitable manner according to the design of the WTG 10 and the WPP 1 during normal operation of the WTG 10 while the WPP 1 remains connected to the external grid 2. For example, the power consuming sub-systems 21 may be powered by the local grid 3 and/or the external grid 2, optionally via a dedicated power supply grid. In this case the WTG power system 23 may be operated as a backup power system only. Alternatively, the power consuming sub-systems 21 may be powered by the WTG power system 23 during normal operation of the WTG 10. However, in either case, the WTG power system 23 is configured to supply DC current to at least some of the power consuming sub-systems 21 during a grid loss such that the WTG 10 is able to continue operating during the grid loss, even in cases in which the power consuming sub-systems 21 have been disconnected from their usual power source.

The WTG controller 20 is a control system that includes various different control modules that are configured to control operation of the WTG 10 and its various sub-systems 21. In particular, the WTG controller 20 comprises a speed control module 30 and a pitch angle control module 40 (among other modules). The speed control module 30 is configured to monitor the speed of the wind turbine 10 (i.e. rotor speed and/or generator speed) at least substantially in real time, for example using a speed sensor or alternatively by calculating or estimating the turbine speed, and to regulate the speed of the rotor 11 and the generator 16. The pitch angle control module 40 is configured to set the pitch angle of the blades 12, for example by calculating a pitch angle set point and controlling operation of the pitch control actuation system 22 in order to achieve the desired blade pitch angle. The pitch angle set point may, for example, be calculated in dependence on the current wind turbine speed and a power demand received from the PPC 7, although other operating parameters may additionally be taken into account when setting the pitch angle set point.

It will be appreciated that the basic WTG architecture illustrated in FIG. 3 is shown schematically and in a highly simplified form for illustrative purposes only, and that the WTGs 10 may further comprise other sub-systems and control modules arranged in any suitable manner.

Figure 4:
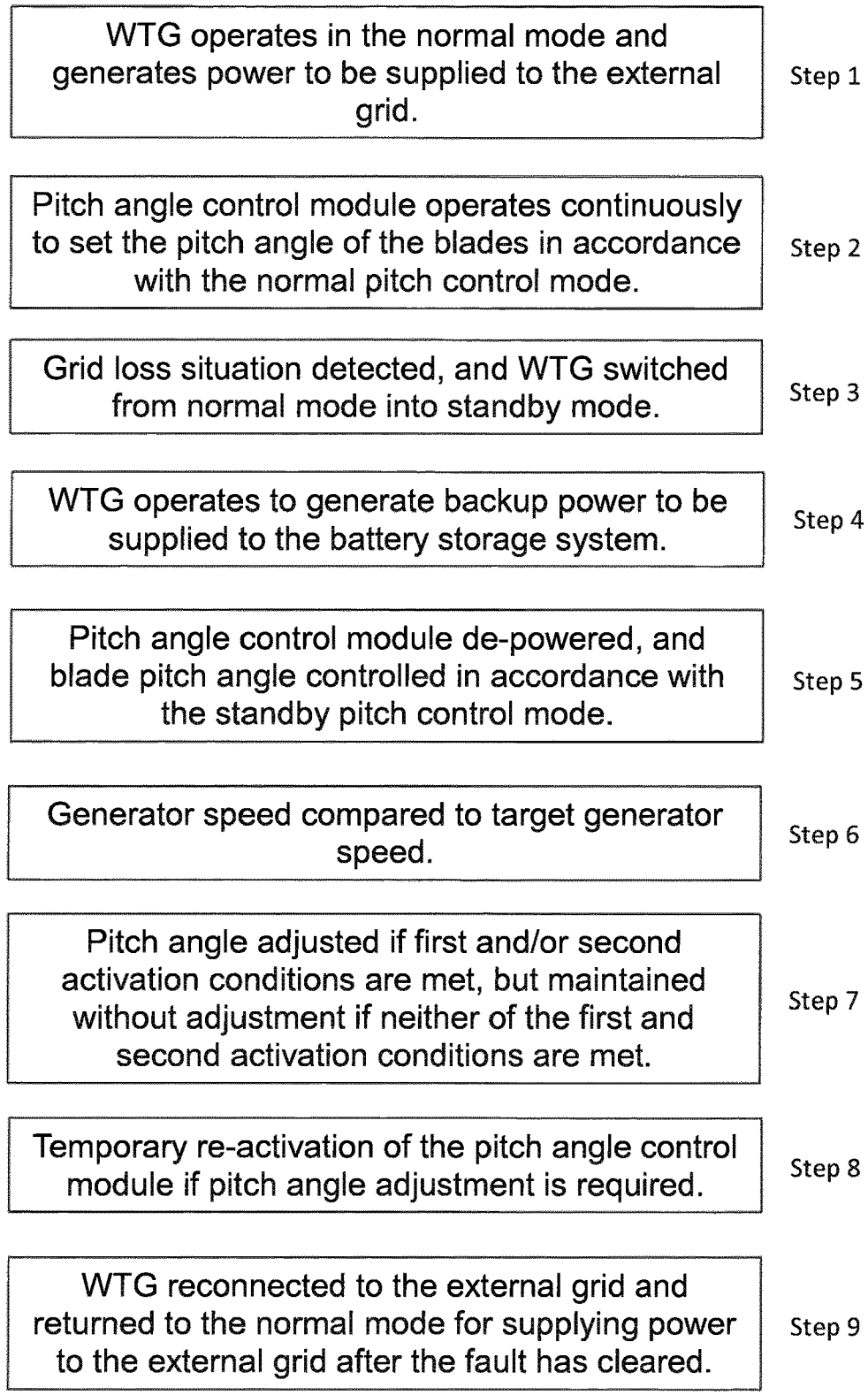
FIG. 4 is a flow chart showing method steps by which the wind turbine generators of the power plant illustrated in FIG. 1 are controlled during normal operating conditions and during a grid loss.

Operation of the WTGs 10 during normal operating conditions and during a grid loss will now be described with reference to the flow chart of FIG. 4. The following description refers to the control of a single WTG 10, although it will be appreciated that each of the WTGs 10 may be controlled in an equivalent manner.

Under normal operating conditions, while the WPP 1 is connected to the external grid 2 and the external grid 2 is available to receive power from the WPP 1, the WTG 10 is operated in a normal mode to generate power to be supplied to the external grid 2 via the local grid 3 and the transmission line 4, as indicated in step 1.

While the WTG 10 is being operated in the normal mode, the pitch angle control module 40 is operated continuously to calculate a pitch angle set point for the blades 12 in accordance with a normal pitch control mode, and to control operation of the pitch control actuation system 22 in order to achieve the desired blade pitch angle, as indicated in step 2. The normal pitch control mode has low thresholds for performing pitch angle adjustment operations and therefore provides substantially continuous adjustment of the pitch angle of the blades 12, including in response to small and/or transient changes in operating conditions, in order to provide accurate control of the of the rotor speed and generator speed, and to optimise and/or maximise the power output of the WTG 10.

Under certain operating conditions the WTG 10 may be disconnected from and prevented from supplying power to the external grid 2, for example if the external grid 2 is completely unavailable or is determined to have become unstable. In this case a "grid loss" situation is detected, for example by the PPC 7 and/or the WTG controller 20, and the WTG 10 is automatically switched from the normal mode into a separate standby mode in which the WTG 10 continues to run (i.e. the rotor 11 continues to rotate) but the WTG 10 is not operated to supply power to the external grid 2, as indicated in step 3. In some cases the rotor 11 may continue to rotate without interruption, although in other cases the rotor 11 may initially be stopped upon detection of the grid loss before recommencing rotation, for example by feathering the blades 12.

While the WTG is 10 operating in the standby mode during the grid loss, the power consuming sub-systems 21 may be disconnected from their usual power source. In order to enable continued operation of the WTG 10 during the grid loss, the WTG controller 20 and various other critical sub-systems are powered at least intermittently by the WTG power system 23. However, in order to minimise standby power usage and preserve the life of the BSS 24, non-critical sub-systems including, for example, the lift system, lighting system, heating system, cooling system, ventilation system, hydraulic pump system and non-critical sensor systems may be automatically de-powered in the standby mode.

As the rotor 11 continues to rotate while the WTG 10 is operating in the standby mode, the WTG 10 may be operated to generate backup power to be supplied to the BSS 24, optionally using the same generator 16 and power converter 19 that are used during normal operation of the WTGs 10, as indicated in step 4. In some cases the BSS 24 may be charged at least substantially continuously, for example by trickle charging, although in other cases the BSS 24 may be charged only when a charging condition is met, for example when the BSS 24 falls below an energy threshold.

When the WTG 10 enters the standby mode, the pitch angle control module 40 is also de-powered such that the pitch angle of the blades 12 is no longer controlled using the normal pitch control mode. Instead, the pitch angle of the blades 12 is controlled in accordance with a separate standby pitch control mode, as indicated in step 5.

Under the standby pitch control mode, the speed control module 30 continues to monitor the generator speed. In some embodiments the generator speed may be monitored at a lower frequency when the WTG is operating in the standby mode compared to when the WTG is operating in the normal mode, for example with a monitoring period of 10 seconds. The generator speed is then compared to a target generator speed, as indicated in step 6. The target generator speed may be a pre-set speed, which may be set, for example, during design, installation or calibration of the WTG 10. Alternatively, the target generator speed may be variable, and may be calculated during operation of the WTG 10. The target generator speed is preferably a speed that is well suited to generating backup power during a grid loss. In the present embodiment the target generator speed is pre-set at 60 rpm, although other values may equally be selected, for example 80 rpm or 100 rpm. A generator speed in the range 40-100 rpm has been determined to be particularly well suited to generating backup power in the standby mode.

In the standby pitch control mode, the pitch angle of the blades 12 is adjusted if it is determined by the speed control module 30 that the current generator speed has deviated from the target generator speed over a sustained period of time or by a large or significant extent, as indicated in step 7. In particular, if the generator speed falls outside a first threshold of +1-20 rpm (or +/−30%) of the target generator speed (that is above 80 rpm or below 40 rpm) continuously over a period of at least 300 seconds then it is determined that a first activation condition corresponding to a sustained error in generator speed has been met, and the pitch angle of the blades is adjusted to reduce or eliminate the speed error. Similarly, if the generator speed falls outside a second threshold of +60 rpm/−40 rpm (or +100%/−65%) of the target generator speed (that is above 120 rpm or below 20 rpm) then it is determined that a second activation condition corresponding to a large or significant error in generator speed has been met, and the pitch angle of the blades is adjusted to reduce or eliminate the speed error. However, if neither of the activation conditions has been met then it is determined that no pitch angle adjustment is required, in which case the pitch angle of the blades 12 is maintained without adjustment.

In this way, the pitch angle of the blades is only adjusted in response to sustained or significant changes in operating conditions without also being adjusted in response to transient or small changes, so that the rotor speed and generator speed can be maintained within acceptable limits while also minimising the power consumed by the WTG 10 in performing pitch angle adjustment operations. In some embodiments the pitch angle of the blades 12 may be adjusted at a lower pitch rate when the WTG is operating in the standby mode compared to when the WTG is operating in the normal mode, for example at 20% of the normal pitch rate, in order to further reduce power consumption.

According to one possible embodiment, if it is determined by the speed control module 30 that the pitch angle of the blades 12 is to be adjusted while the WTG 10 is operating in the standby mode (for example if the first and/or second activation conditions have been met), the pitch angle control module 40 is re-activated and operated to control the pitch angle of the blades 12 in order to reduce or eliminate the error between the generator speed and the target generator speed, as indicated in step 8. In some cases the pitch angle of the blades 12 may be adjusted in accordance with the normal pitch control mode if it is determined that the pitch angle of the blades 12 is to be adjusted while the WTG 10 is operating in the standby mode. However, once the pitch angle of the blades 12 has been adjusted, the pitch angle control module 40 is then de-activated in order to prevent further unnecessary pitch angle adjustment operations from being performed. In other embodiments pitch angle adjustments may be controlled by a separate control module while the WTG is operating in the standby mode, for example by the speed control module 30 or another module forming part of the WTG controller 20, in which case it may not be necessary for the pitch angle control module 40 to be re-activated.

While the WTG 10 is operating in the standby mode, the PPC 7 and the WTG controller 20 continue to monitor the availability of the external grid 2. Once the fault has cleared and the external grid 2 is once again available to receive power, the WTG 10 is reconnected to the external grid 2 and returned to the normal mode for supplying power to the external grid 2, as indicated in step 9. Upon the WTG 10 re-entering the normal mode, the pitch angle control module 40 is re-activated and operated to continuously control the pitch angle of the blades 12 in accordance with the normal pitch control mode.

Control of the pitch angle of the blades 12 in the case that the first and/or second activation conditions are met in the standby pitch control mode will now be described with reference to FIG. 5.

The current generator speed is compared to the target generator speed, as described above in connection with step 7. As long as the generator speed remains within the first threshold (that is between the first/low threshold upper limit and the first/low threshold lower limit) no action is taken to adjust the pitch angle of the blades 12 and the pitch angle control module 40 is not activated. However, if the generator speed falls outside the first threshold continuously over a period of at least 300 seconds then it is determined that there has been a sustained change in the operating condition of the WTG 10, and the pitch angle control module 40 is reactivated and operated to adjust the pitch angle of the blades 12. In this case, a gain value "K" used in setting the pitch angle of the blades is increased over a time period at a first gain rate to a value of 1 such that the pitch angle of the blades can be adjusted in accordance with the normal pitch control mode.

If the generator speed error is reduced or eliminated then the gain value is reduced back to a value of 0 (as indicated by the line labelled as "A" in FIG. 5) and the pitch angle control module 40 is de-activated. If, on the other hand, the generator speed error continues to increase and the generator speed subsequently falls outside the second threshold (for example above the second/high threshold upper limit or below the second/high threshold lower limit) then it is determined that there has been a large or significant change in the operating condition of the WTG 10, and the gain value K is increased further above the value of 1 at a second gain rate (as indicated by the line labelled as "B" in FIG. 5) in order to artificially increase the responsiveness of the pitch angle control module 40. The gain value is then reduced back to a value of 0 and the pitch angle control module 40 is de-activated after the generator speed error has been eliminated.

Figure 5:
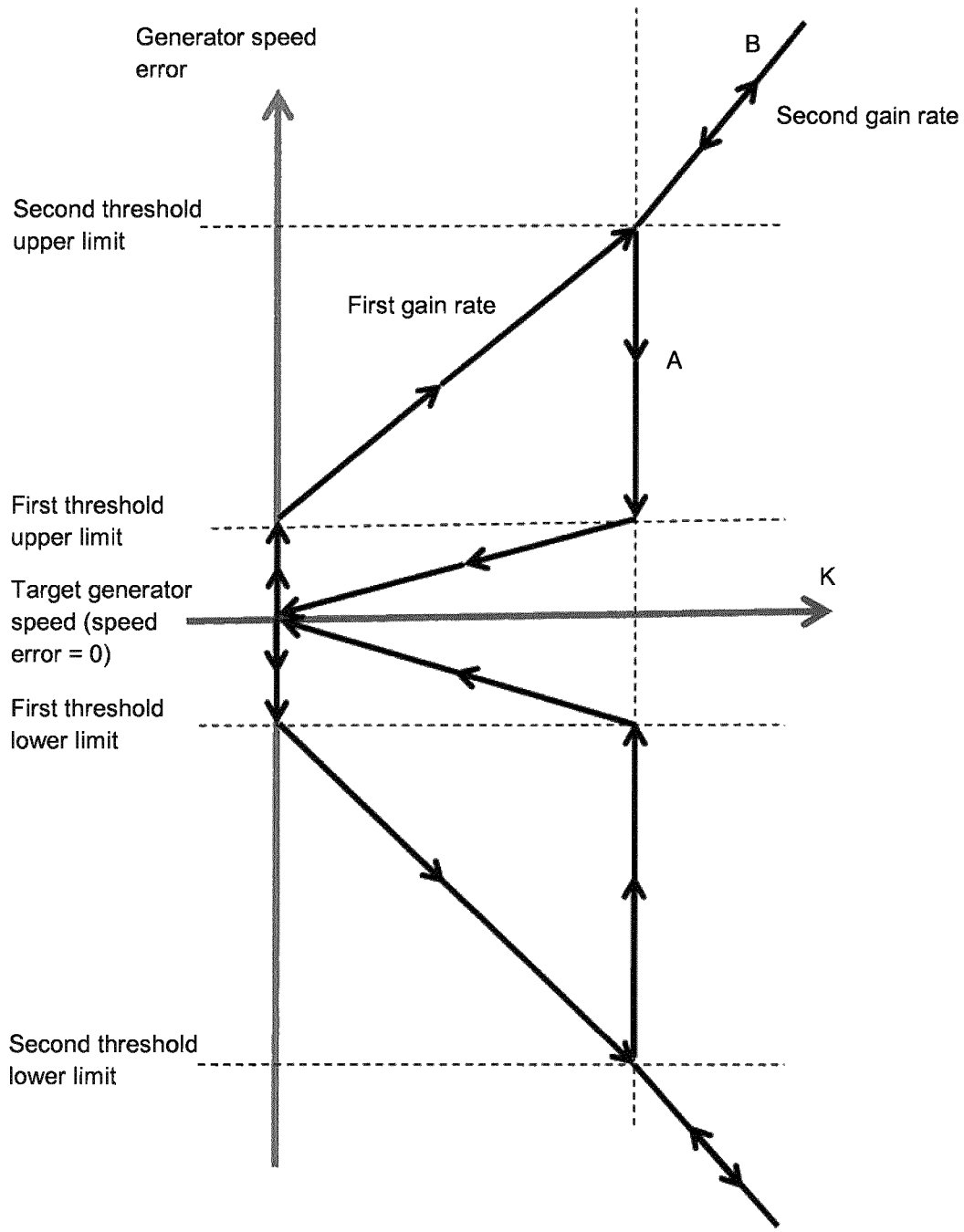
FIG. 5 illustrates a method by which the pitch angles of the blades may be adjusted while the wind turbine generators are operating according to a standby pitch control mode during a grid loss.

FIG. 5 illustrates a case in which the second activation condition is only met after the first activation condition has already been met. However, it is also possible for the second activation condition to be met without the first activation condition having being met, for example if the generator speed increases or decreases rapidly. In this case the pitch angle control module 40 may be reactivated and the gain value K may be increased from a value of 0 without waiting for the first activation condition to also be met before applying corrective action.

The above description relates to one possible embodiment of the present invention. However, it will be appreciated that many modifications and variations to the above-described example are possible within the scope of the appended claims.

For example, the standby pitch control mode described above includes first and second activation conditions for triggering pitch angle adjustment while the WTG is operating in the standby mode, each of which includes a generator speed threshold that is based on a deviation from a target generator speed. However, it will be appreciated that different activation conditions may equally be selected in other embodiments of the present invention. For example, in other embodiments the standby pitch control mode may only include one of the above-described first and second activation conditions, or alternatively may include further activation conditions in addition to the above-described first and second activation conditions. In addition, the thresholds used for determining when the pitch angle of the blades is to be adjusted may have different values to those described above, and may equally be based on a different speed parameter other than generator speed, for example rotor speed or the speed of another drivetrain component. Moreover, the thresholds used for determining when the pitch angle of the blades is to be adjusted may have individually defined start and end points, which need not be based on any explicitly defined target speed.

In an embodiment, the method of operating the wind turbine generator may applied during installation where the grid is lost in an extended period for example due to damage of the export cable. In this situation, the WTG may be operated using the method until normal mode operation can be established. In this situation, the embodiment is directed towards:

A method of operating a wind turbine generator (WTG) comprising a pitch control system prior to grid connection to an external grid, the method comprising:
 a) enabling the WTG for a normal mode operation, comprising enabling the WTG with the ability for controlling the pitch angle of the blades;
 c) detecting that normal mode operation is not possible due to the WTG not being connected to the external grid;
 d) operating the WTG in a standby mode; and
 e) controlling the pitch angle of the blades in dependence on a monitored speed parameter of the WTG using a standby pitch control mode different to the normal pitch control mode while the WTG is operating in the standby mode, wherein the standby pitch control mode is less responsive than the normal pitch control mode such that the power consumption of the pitch control system is reduced when the WTG is operating in the standby mode.

Other variations and modifications will also be apparent to those skilled in the art.

The invention claimed is:

1. A method of operating a wind turbine generator (WTG) comprising a pitch control system, the method comprising:
 a) operating the WTG in a normal mode while the WTG is connected to an external grid;
 b) controlling a pitch angle of blades of the WTG using a normal pitch control mode while the WTG is operating in the normal mode;
 c) detecting a grid loss;
 d) operating the WTG in a standby mode during the grid loss, wherein in operating the WTG in the standby mode during the grid loss, the WTG is operated to generate backup power to power one or more subsystems of the WTG and/or to charge an energy storage system associated with the WTG; and
 e) controlling the pitch angle of the blades in dependence on a monitored speed parameter of the WTG using a standby pitch control mode different to the normal pitch control mode while the WTG is operating in the standby mode, wherein the standby pitch control mode is less responsive than the normal pitch control mode such that power consumption of the pitch control system is reduced when the WTG is operating in the standby mode, and
wherein the standby pitch control mode is less responsive than the normal pitch control mode in that fewer pitch angle adjustment operations are performed in the standby pitch control mode than in the normal pitch control mode for a given set of conditions.

2. The method of claim 1, wherein, while the WTG is operating in the standby mode, higher activation thresholds are applied such that the pitch angle of the blades is only adjusted when the monitored speed parameter deviates from a target speed over a sustained period of time and/or by a significant extent.

3. The method of claim 1, wherein, while the WTG is operating in the standby mode, the pitch angle of the blades is adjusted when a first activation condition is met, but maintained without adjustment when the first activation condition is not met; the first activation condition comprising the monitored speed parameter falling outside a first threshold over a specified time period.

4. The method of claim 3, wherein the first threshold has an upper limit of at least +20% and/or a lower limit of at least-20% of a target speed.

5. The method of claim 3, wherein the first threshold spans a range of generator speeds of at least 20rpm.

6. The method of claim 3, wherein the specified time period is at least 30 seconds.

7. The method of claim 1, wherein, while the WTG is operating in the standby mode, the pitch angle of the blades is adjusted when a second activation condition is met, but maintained without adjustment when the second activation condition is not met; the second activation condition comprising the monitored speed parameter falling outside a second threshold.

8. The method of claim 7, wherein the second threshold has an upper limit of at least +50% and/or a lower limit of at least-30% of a target speed.

9. The method of claim 7, wherein the second threshold spans a range of generator speeds of at least 50rpm.

10. The method of claim 1, wherein the method comprises increasing a gain factor used for controlling the pitch angle of the blades when it is determined that the pitch angle of the blades is to be adjusted while the WTG is operating in the standby mode.

11. The method of claim 10, wherein the gain factor is increased to a first predetermined value when a first activation condition has been met.

12. The method of claim 10, wherein the gain factor is increased above a value of 1 when a second activation condition has been met.

13. The method of claim 1, wherein the WTG is provided with a pitch angle control module for setting the pitch angle of the blades while the WTG is operating in the normal mode, the method comprising, while the WTG is operating in the standby mode, de-activating the pitch angle control module.

14. The method of claim 13, the method further comprising re- activating the pitch angle control module and using the pitch angle control module to set the pitch angle of the blades when it is determined that the pitch angle of the blades is to be adjusted while the WTG is operating in the standby mode.

15. The method of claim 1, wherein a lower pitch rate is applied when adjusting the pitch angle of the blades when the WTG is operating in the standby mode compared to when the WTG is operating in the normal mode.

16. The method of claim 1, wherein the monitored speed parameter is monitored at a lower frequency when the WTG is operating in the standby mode compared to when the WTG is operating in the normal mode.

17. The method of claim 1, wherein the monitored speed parameter is a generator speed or a rotor speed.

18. A non-transitory computer readable medium storing program code instructions for implementing an operation of a wind turbine generator (WTG) comprising a pitch control system, the operation comprising:
a) operating the WTG in a normal mode while the WTG is connected to an external grid;
b) controlling a pitch angle of blades of the WTG using a normal pitch control mode while the WTG is operating in the normal mode;
c) detecting a grid loss;
d) operating the WTG in a standby mode during the grid loss, wherein in operating the WTG in the standby mode during the grid loss, the WTG is operated to generate backup power to power one or more subsystems of the WTG and/or to charge an energy storage system associated with the WTG; and
e) controlling the pitch angle of the blades in dependence on a monitored speed parameter of the WTG using a standby pitch control mode different to the normal pitch control mode while the WTG is operating in the standby mode, wherein the standby pitch control mode is less responsive than the normal pitch control mode such that power consumption of the pitch control system is reduced when the WTG is operating in the standby mode, and
wherein a lower pitch rate is applied when adjusting the pitch angle of the blades when the WTG is operating in the standby mode compared to when the WTG is operating in the normal mode.

19. The non-transitory computer readable medium of claim 18, wherein, while the WTG is operating in the standby mode, higher activation thresholds are applied such that the pitch angle of the blades is only adjusted when the monitored speed parameter deviates from a target speed over a sustained period of time and/or by a significant extent.

20. A controller, comprising:
an I/O interface configured to be coupled to a wind turbine generator (WTG) comprising a pitch control system;
a non-transitory computer readable medium storing program code instructions;
and one or more processors which, in executing the program code instructions, are configured to perform an operation comprising:
a) operating the WTG in a normal mode while the WTG is connected to an external grid;
b) controlling a pitch angle of blades of the WTG using a normal pitch control mode while the WTG is operating in the normal mode;
c) detecting a grid loss;
d) operating the WTG in a standby mode during the grid loss, wherein in operating the WTG in the standby mode during the grid loss, the WTG is operated to generate backup power to power one or more subsystems of the WTG and/or to charge an energy storage system associated with the WTG; and
e) controlling the pitch angle of the blades in dependence on a monitored speed parameter of the WTG using a standby pitch control mode different to the normal pitch control mode while the WTG is operating in the standby mode, wherein the standby pitch control mode is less responsive than the normal pitch control mode such that power consumption of the pitch control system is reduced when the WTG is operating in the standby mode, and
wherein the monitored speed parameter is monitored at a lower frequency when the WTG is operating in the standby mode compared to when the WTG is operating in the normal mode.

* * * * *